UNITED STATES PATENT OFFICE.

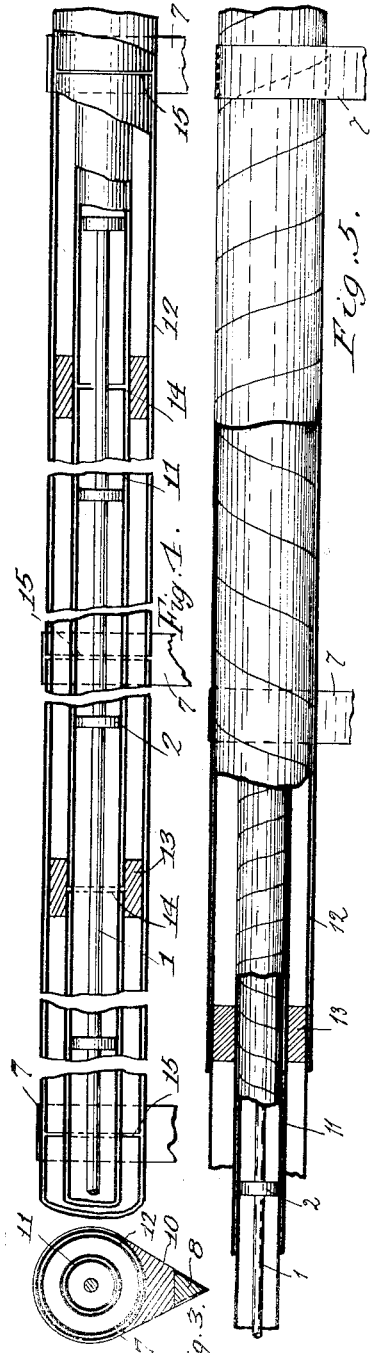
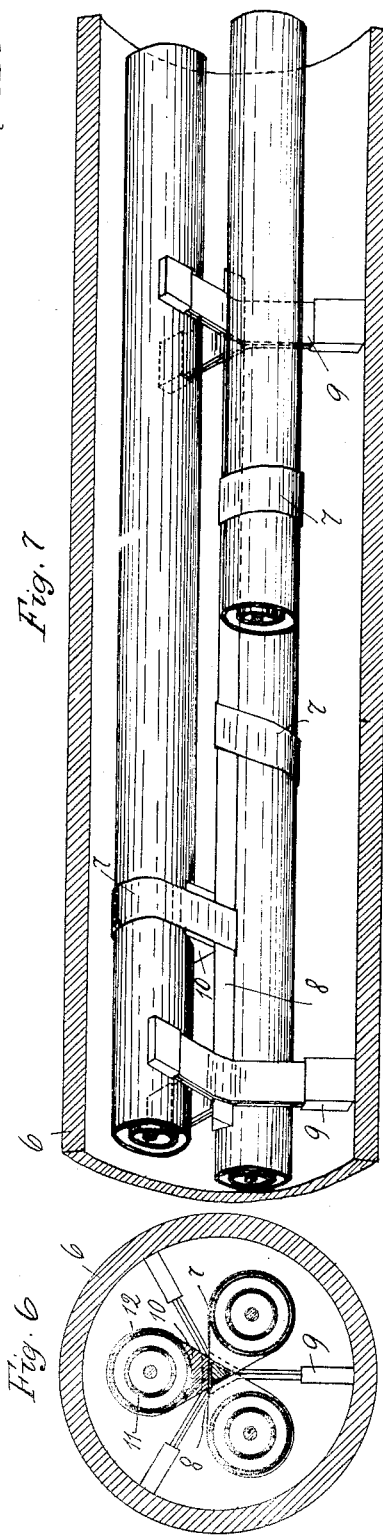

VICTOR PINDTER von PINDTERSHOFEN, OF WIENER-NEUSTADT, AUSTRIA-HUNGARY.

ELECTRIC CABLE.

1,037,522.

Specification of Letters Patent.

Patented Sept. 3, 1912.

Application filed January 27, 1909. Serial No. 474,631.

*To all whom it may concern:*

Be it known that I, VICTOR PINDTER VON PINDTERSHOFEN, a subject of the Austro-Hungarian Emperor, and residing at Wiener-Neustadt, Austria-Hungary, have invented certain new and useful Improvements in Electric Cables, of which the following is a specification.

The present invention relates to electric cables and an important object is to provide a high tension cable having air insulation.

Even if cables of the ordinary kind, in which the conductors are surrounded with solid insulating material, have been made heretofore capable of employment for tensions up to 15,000 and 20,000 volts, nevertheless such cables have a number of disadvantages which only exceptionally, and also only for relatively small distances, admit of the employment of such high tension cables instead of aerial lines. Especially does it appear impossible, however, to conduct currents of still higher tensions with such cables, since every solid insulating material admits of the passage of weak currents at very high tensions. This leakage of the current increases with the length of the cable itself, so that frequently for this reason alone long high tension conductors were found to be uneconomical. A further important disadvantage of such cables, which are fed almost without exception with alternating currents is the very great capacity of the same in consequence of the high dielectric constant of the insulating material. Apart from these defects the weight of such a cable covered with solid insulating material is not small and the cost of manufacture is relatively large. For all these reasons it appears impossible in practice to employ cables, in which the conductors are surrounded with solid insulating material, for long distances for supplying large currents at very high tensions, or to manufacture usable cables for tensions higher than about 20,000 volts.

In the high tension cable according to the present invention dry air is employed as insulation, the conductors being arranged in an insulating, closed protecting tube. The dry air is on the one hand a very good insulator, and on the other hand, even at very high tensions, only a very small, scarcely measurable capacity results. For increasing the insulation still further, according to the present invention each conductor is surrounded at some distance from it with an additional insulating, solid partition in the form of a concentric tube or also, according to the degree of insulation in each instance, with two or more tubes, which likewise are inserted one in another concentrically with an air space between them. In order to keep the conductors in the centers of the tubes they are held by insulating supports in the form of beads or small disks which are arranged in rows at intervals on the conductors. Owing to the arrangement of the insulating tubes a combined insulation by means of air and solid insulating material is obtained, a very high degree of certainty against break-down being obtained, without increasing the capacity. The arrangement of two or more concentric insulating tubes with an air space between them is employed for very high tensions. Besides the combined insulation by dry air and the concentric insulating tubes, in accordance with the present invention for certainly preventing the current leaking an additional means is employed, namely the path which the current tends to take when leaking from the conductors along the solid insulating material is made very long and of as small cross-section as possible. For this purpose the insulating beads or small disks, which hold the conductors in the centers of the insulating tubes, are displaced longitudinally relatively to the supports or holders which are outside the insulating tubes and which carry the insulating tubes of the individual conductors in the principal protecting tube. When several concentric tubes are employed around each conductor the bars or holders which keep the individual concentric tubes at the proper distance from one another are also displaced relatively to the outside supports of the insulating tubes. In this manner a step-like path in the solid material is formed. Further, the insulating tubes of the individual conductors can be held at central longitudinal bars by shackles, supporters, suspenders or the like arranged at intervals and displaced relatively to one another along the individual insulating tubes, which longitudinal bars are carried by separate frames supported against the interior wall of the exterior protecting tube. By this arrangement the path for a possible leakage current along the solid insulating material is made exceedingly long but is of small breadth and has a small cross-sectional area.

In orde that the invention may be clearly understood reference will be made to the accompanying drawing in which several embodiments are represented by way of example, and in which:

Figure 1 is a vertical section, and Fig. 2 a longitudinal section, partly in elevation, of a cable in which only one concentric insulating tube is provided around each conductor within a common outer protecting tube; Figs. 3 and 4 are like views, respectively, of a cable comprising two concentric insulating tubes surrounding a conductor; Fig. 5 is a longitudinal section, partly in elevation, of a cable having concentric insulating spiral windings forming tubes arranged around the conductor, whereas Fig. 6 is a cross-section through a cable in which each conductor is surrounded by two concentric insulating tubes, and Fig. 7 is a sectional perspective view of the latter cable showing the manner in which the insulating tubes are supported in the outer protecting tube.

Referring to the drawing, on the metallic conductor 1 insulating beads or disks 2 are arranged in rows at considerable distances from one another and hold the conductor free in the center of the insulating tube 3. In this manner the conductor is surrounded by air with the exception of the exceedingly small places which are covered by the disks 2. The insulating tubes 3, 4 and 5 (Figs. 1 and 2) surrounding the conductors 1 and arranged at intervals from one another, and which are preferably hermetically sealed their entire length to prevent the admission of moisture, are arranged in an insulating protecting tube 6 which surrounds the insulating tubes at a short distance from them and is likewise closed air-tight. In this manner air insulation is also provided outside the insulating tubes. In order to hold the insulating tubes 3, 4 and 5 free in the protecting tube 6, the same are attached by means of insulating supporters or suspenders 7 to insulating bars 8 which are arranged at intervals in the center longitudinally of the cable and are carried by separate frames 9 of insulating material. In the constructional form represented the frames 9 have the form of tripods as clearly shown in Figs. 1, 2 and 7. For obtaining the space between the insulating tubes insulating supporting members 10 are inserted. As the contact between the solid insulating material and the conductor is limited to only individual short places, on the one hand a very high insulation of the conductor is obtained and on the other hand the capacity is kept low. Only the short places of the insulating tube where the disks 2 are located have an exceedingly weak charge which, however, exercises no further reaction on the conductor, since the charge cannot continue farther to the outside through solid insulating material. A further advantage of the described arrangement consists in the form of the long path in the solid material which the current would have to take to pass from one conductor to the other or to earth. For leaking to earth, for example, the current would have to pass by way of the disk 2, then along the wall of the tube in question, and by way of the member 10, in order to pass from the bar 8 by way of the tripod 9 to the outer protecting tube 6. The current does not at once tend to jump across the air space and circumvent this long path along or in solid insulating material, particularly when this air space is very dry.

The insulating tubes 3, 4 and 5, as well as the exterior protecting tube 6, are preferably made of paper or like material which is soaked with a mixture of resin, wax, etc. In order to have a certain amount of certainty that no defective places exist in the walls of the tubes, the tubes are made of two superposed layers preferably stuck together by a fusible insulating material which fills up the gap between the two layers. The tubes may comprise separate pieces of tube placed in a row longitudinally, as clearly shown in Figs. 2 and 4, or they may consist of two layers of spiral windings in tubular form with oppositely wound coils, as shown in Fig. 5. If the tubes are composed of individual pieces, the joints of the inner tubes will be displaced with regard to those of the outer tube in the longitudinal direction preferably a distance equal to half the length of the pieces of tube. In order to strengthen both the inner and outer joints and also to assure that the insulation is good, the suspenders 7 with the members 10 are placed at the joints and affixed all around by fusible insulating material (Fig. 2).

For very high tensions, in accordance with the present invention two or more tubes 11 and 12 (Figs. 3 to 6) are employed concentrically surrounding the conductors with an intermediate air space, the distance between which tubes is maintained by insulating rings 13. In the form represented in Figs. 3 and 4, in which the tubes 11 and 12 each consists of two layers of separate tubular pieces placed in rows, the rings 13 are stuck on the joints 14 of the inner double tube 11, whereas the supporters 7 and the members 10 surround the joints 15 of the exterior double tube 12. Here again the individual joints 14 and 15 are displaced relatively to one another longitudinally, so that a very long step-like path is formed for a current passing along the solid insulating material and simultaneously the capacity of the cable is kept low. In like manner in the form represented in Fig. 5, in which spiral windings are employed to form the tubes, the rings 13 are displaced relatively to the suspenders or supporters 7. The exterior protecting tube 6 likewise consists of two superposed layers stuck together. If the latter are composed of individual pieces of tube, as represented in Fig. 2, the joints 16 of the inner and outer layers are relatively displaced and strengthened by means of insulating rings or sleeves 17 affixed to them. The protecting tube 6 is surrounded along its entire length with a protecting layer 18 of tar, asphalt, wood-cement or the like and with a bandage soaked with these materials.

For conveying and erecting the described high tension cable the insulating tubes are pushed together in larger or smaller lengths and stuck together tightly by heated insulating material, for example in a length of 15 to 20 meters. Thereupon the insulating tubes after being fastened to the longitudinal bars provided with the frames or tripods are inserted into the exterior protecting tube assembled in like lengths, and this is sealed at the ends to prevent admission of moist air. For erecting the cable on the spot, on each portion of cable at the one end the exterior layer and at the other end the interior layer of each double tube, both insulating tubes and also protecting tube, is laid bare, so that at the ends of the portions of cable the tubes can be inserted one in another up to the joints, the heated insulating material being continuously employed, so that the form of cable clearly shown in Figs. 2 and 4 is obtained. In this manner one continuous homogeneous construction, and an equally high insulation is obtained in the high tension cable along its entire length.

The wires provided with the bead or disk insulators are drawn into the insulating tubes in known manner. For this purpose iron wires may be placed into the insulating tubes of each portion of cable from the outset, for example.

What I claim as my invention and desire to secure by Letters Patent is:

1. High tension cable, characterized by the individual conductors being arranged in insulating tubes with a concentric intermediate air space and being mounted in common with an exterior insulating closed protecting tube at a distance from the inner wall of the same, whereby a combined air and material insulation is obtained and high capacity of the cable is avoided.

2. In electric cables, the combination with individual conductors, insulating tubes concentrically arranged relatively to the respective conductors, and supports separating the conductors from the tubes, whereby an intermediate air space is formed between the conductor and tube; of a common exterior protecting tube and supports for spacing the exterior tube from the insulating tubes, the said last-named supports being displaced longitudinally with regard to the supports separating the conductors from the insulating tubes, whereby an elongated path is obtained for any current leakage.

3. In electric cables, the combination with individual conductors, insulating tubes concentrically arranged relatively to said conductors, and supports separating the conductors from the tubes, whereby an intermediate air space is formed between the conductor and tube, of a common exterior protecting tube and supports for spacing the exterior tube from the insulating tubes, the said last named supports being displaced longitudinally with regard to the supports separating the conductors from the insulating tubes, whereby an elongated path is obtained for any current leakage.

4. In electric cables, the combination with individual conductors, an insulating tube concentrically arranged around each conductor, means holding apart the tube from the conductor and forming a concentric air-space between conductor and tube, this insulating tube consisting of two tightly telescoped tubes made of sections, the joints of which are longitudinally displaced with regard to each other.

5. In electric cables, the combination with individual conductors, an insulating tube concentrically arranged around each conductor, means holding apart the tube from the conductor and forming a concentric air-space between conductor and tube, another insulating tube concentrically around the latter, means holding this tube concentrically with regard to the first one and forming an insulating air-space, whereby the insulating tubes consist of two tightly telescoped tubes; said tubes being made of sections, the joints of which are longitudinally displaced with regard to one another.

6. In electric cables, the combination with individual conductors, an insulating tube concentrically arranged around each conductor, and means holding apart the tube from the conductor and forming a concentric air-space between conductor and tube; this insulating tube consisting of two tightly telescoped tubes of several lengths, the outer insulating tube being surrounded by a supporting ribbon at the one side and by an inserted insulating wedge at the other side for mechanically and electrically reinforcing the joint and obtaining a larger resistance.

7. In electric cables, the combination with individual conductors, an insulating tube concentrically arranged around each conductor, means holding apart the tube from the conductor and forming a concentric air-space between conductor and tube, another insulating tube concentrically around the latter, and sleeves to hold this tube concentrically with regard to the other; these sleeves being arranged to tightly surround the inner and outer layers of the inner insulating tube for mechanically and electrically reinforcing the joint and obtaining a larger resistance.

8. In electric cables, the combination of a plurality of individual conductors, insulating tubes concentrically arranged relatively to said conductors, supports holding apart the conductors from the tubes and forming an air-space between conductor and tube, a common outer protective tube, and supports forming a space between the outer tube and the insulating tube; the outer protective tube consisting of two layers of tightly telescoped tube lengths, the joints being longitudinally displaced with regard to each other and sleeves being arranged around the joints for reinforcement.

9. In electric cables, the combination with individual conductors, insulating tubes concentrically arranged relatively to the respective conductors, and supports separating the conductors from the tubes, whereby an intermediate air space is formed between each conductor and tube; of a common exterior protecting tube, supports for spacing the exterior tube from the insulating tubes, a middle bar with spacing members about which said insulating tubes are disposed, insulating supporting ribbon binding together the insulating tubes, spacing members and middle bar for the purpose of spacing the single tubes from each other and from the bar, and an insulating star for holding this bar in the midst of the tube and for holding the insulating tubes apart from the outer protective tube.

10. In electric cables, the combination with individual conductors, insulating tubes concentrically arranged relatively to said conductors, and supports separating the conductors from the tubes, whereby an intermediate air space is formed between the conductor and tube; of a common exterior protecting tube and supports for spacing the exterior tube from the insulating tubes; the several insulating tubes consisting of single telescoped tube-lengths with longitudinally displaced joints, the joints of the different tubes being also longitudinally displaced with regard to each other; there being provided a middle bar for holding the tubes, insulating supporting ribbons binding the tubes to the bar, surrounding the longitudinally displaced joints of the insulating tubes for the purpose of reinforcement, and means for holding the bar and thereby the insulating tubes in the midst of the outer protective tube.

In testimony whereof, I affix my signature in the presence of two witnesses.

VICTOR PINDTER von PINDTERSHOFEN.

Witnesses:
   ROBERT W. HEINGARTNER,
   AUGUST FUGGER.